(12) United States Patent
Bhavsar et al.

(10) Patent No.: US 11,144,486 B2
(45) Date of Patent: Oct. 12, 2021

(54) SYSTEM AND METHOD FOR OVERCOMING IN-BAND INTERRUPT STARVATION WITH DYNAMIC ADDRESS REMAPPING

(71) Applicant: DELL PRODUCTS, LP, Round Rock, TX (US)

(72) Inventors: Nihit S. Bhavsar, Austin, TX (US); Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/803,075

(22) Filed: Feb. 27, 2020

(65) Prior Publication Data

US 2021/0271619 A1  Sep. 2, 2021

(51) Int. Cl.
*G06F 13/24* (2006.01)
*G06F 13/42* (2006.01)
*G06F 9/4401* (2018.01)

(52) U.S. Cl.
CPC ............ *G06F 13/24* (2013.01); *G06F 9/4401* (2013.01); *G06F 13/4291* (2013.01); *G06F 2213/0016* (2013.01); *G06F 2213/2402* (2013.01)

(58) Field of Classification Search
CPC .... G06F 13/24; G06F 9/4401; G06F 13/4291; G06F 2213/2402; G06F 2213/0016
See application file for complete search history.

(56) References Cited

U.S. PATENT DOCUMENTS

| 2008/0307148 | A1 | 12/2008 | Naderi et al. | |
| 2008/0307154 | A1 | 12/2008 | Naderi et al. | |
| 2009/0150691 | A1* | 6/2009 | Chen | G06F 1/3209 |
| | | | | 713/310 |
| 2020/0073833 | A1* | 3/2020 | Graif | G06F 13/4291 |
| 2020/0089632 | A1* | 3/2020 | Graif | G06F 13/362 |
| 2020/0380175 | A1* | 12/2020 | Klein | B60R 25/241 |

* cited by examiner

*Primary Examiner* — Idriss N Alrobaye
*Assistant Examiner* — Ronald T Modo
(74) *Attorney, Agent, or Firm* — Larson Newman, LLP

(57) ABSTRACT

An information handling system includes a processor with an Improved Inter-Integrated Circuit (I3C) master interface, a first device with a first I3C slave interface, and a second device with a second I3C slave interface. The first I3C slave interface provides first In-Band Interrupts (IBIs) to the I3C master interface and has a first I3C address. The second I3C interface provides second IBIs to the I3C master interface and has a second I3C address. The second I3C address is higher than the first I3C address. The processor receives the first IBI, determines that the second IBIs are masked by the first Mb due to the second I3C address being higher than the first I3C address, and assigns a third I3C address to one of the first I3C slave interface and the second I3C slave interface in response to determining that the second IBIs are masked by the first IBIs.

20 Claims, 4 Drawing Sheets

SYSTEM AND METHOD FOR OVERCOMING IN-BAND INTERRUPT STARVATION WITH DYNAMIC ADDRESS REMAPPING

FIELD OF THE DISCLOSURE

This disclosure generally relates to information handling systems, and more particularly relates to overcoming in-band interrupt starvation with dynamic address remapping in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a processor with an Improved Inter-Integrated Circuit (I3C) master interface, a first device with a first I3C slave interface, and a second device with a second I3C slave interface. The first I3C slave interface may provide first In-Band Interrupts (IBIs) to the I3C master interface and have a first I3C address. The second I3C interface may provide second IBIs to the I3C master interface and have a second I3C address. The second I3C address may be higher than the first I3C address. The processor may receive the first IBI, determine that the second IBIs are masked by the first IBIs due to the second I3C address being higher than the first I3C address, and assign a third I3C address to one of the first I3C slave interface and the second I3C slave interface in response to determining that the second IBIs are masked by the first IBIs.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
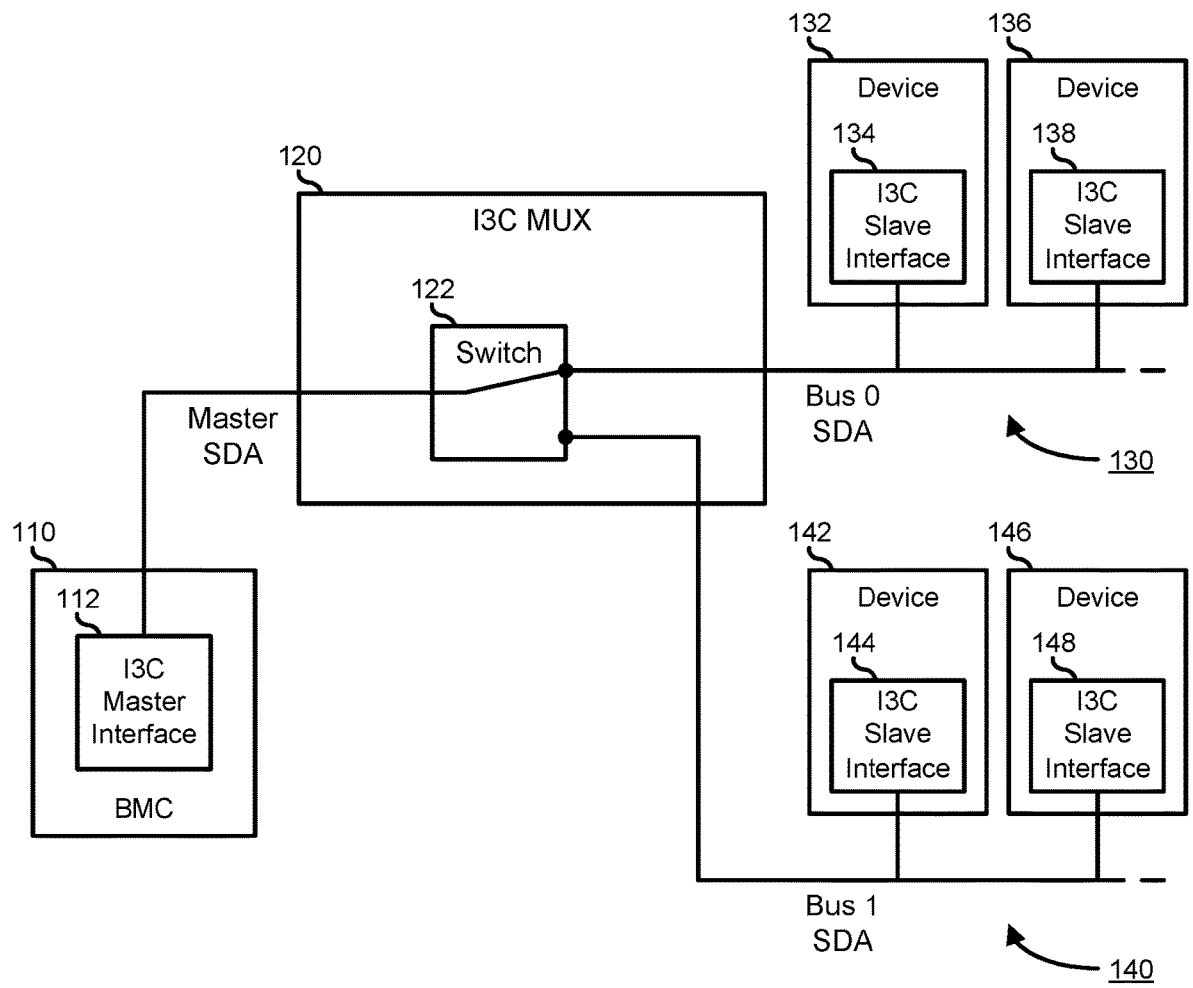
FIG. 1 is a block diagram illustrating an information handling system according to an embodiment of the present disclosure.

FIG. 1 illustrates an information handling system 100 including a baseboard management controller (BMC) 110 with an Improved Inter-Integrated Circuit (I3C) interface 112, a I3C multiplexor 120, and I3C buses 130 and 1 40. I3C multiplexor 120 includes a switch 122. I3C is a two-wire multidrop serial data interface standard provided by the Mobile Industry Processor Interface (MIPI) Alliance, and serves as an evolution of the Serial Peripheral Interface (SPI) and Inter-Integrated Circuit (I2C) interface for providing side-band management and control of devices on information handling systems. Here, information handling system 100 may include a host processing system that represents the hardware, firmware, and software components that are typically associated with a computer or other information handing system, and that includes devices 132, 136, 142, and 146 as components for providing various processing tasks at in response to the execution of machine-executable code by a processor of the information handling system.

Information handing system 100 may further include a management system that represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide a management environment for the information handling system. As such, BMC 110 and I3C multiplexor 120 are connected to devices 132, 136, 142, and 146 via respective I3C slave interfaces 134, 138, 144, and 148 to provide an out-of-band (OOB) mechanism to retrieve information related to the operation of the devices and the host environment, to provide BIOS/UEFI or system firmware updates, to manage non-processing components of information handling system 100, such as system cooling fans and power supplies. An example of BMC 110 may include a commercially available BMC product or other device that operates in accordance with an Intelligent Platform Management Initiative (IPMI) specification, a Web Services Management (WS-MAN) interface, a Redfish or other Distributed Management Task Force (DMTF) standard, or another managed system standard, and can include one or more devices such as an Integrated Dell Remote Access Controller (iDRAC), an Embedded Controller (EC), or the like. Information handling system 100 may include additional memory devices, logic devices, security devices, or the like, as needed or desired.

I3C master interface 112 is connected via a data line (SDA) to switch 122, and the switch selectively connects the data line (SDA) to the data lines of either I3C bus 130 (bus 0) or I3C bus 140 (bus 1). It will be understood that switch 122 is further configured to selectively provide a clock line (SCL) to each of I3C buses 130 and 140. However, for the simplification of illustration, the clock lines (SCL) to I3C buses 130 and 140 are not illustrated. Information handling system 100 may include one or more additional I3C buses similar to I3C buses 130 and 140, and I3C multiplexor 120 may include elements configured to handle the additional I3C buses, such as additional data line (SDA) inputs to switch 122

The I3C interface provides several improvements over previous two-wire low-speed interfaces, such as SPI and I2C. In particular, I3C provides faster data rates to accommodate the larger number of I3C connected devices. For example, a typical DDR5 DIMM may include six or more I3C slave interfaces (one for a Serial Presence Detect (SPD) hub, one for a Power Management Integrated Circuit (PMIC), one for a Register Control Device (RCD), three or more for temperature sensors, etc.), and a typical server system may include multiple processors that each support up to eight DIMMs on a memory channel, for a total of forty-eight or more I3C slave interfaces per memory channel, in addition to other I3C connected devices that are not associated with the memory channels. Additionally, the I3C interface supports dynamic addressing and address remapping that permits an information handling system to flexibly allocate resources for servicing the multiple I3C interfaces, without being tied to determining the allocation based upon prior fixed addressing schemes. Further, the I3C interface provides Common Command Codes (CCC) that permit for more unified management of the I3C connected devices. Finally, the I3C interface provides for I3C slave devices to issue in-band interrupts (IBI) over the two-wire interface. Here, an I3C slave device can issue an IBI by one of two methods. In the first method, described herein as a "reactive IBI," after an I3C master device generates a START condition, the I3C slave interfaces on a common I3C bus can each transmit their I3C addresses onto the data line (SDA). In the second method, described herein as a "proactive IBI," an I3C slave device can issue a START condition by pulling the data line (SDA) line low. In response, the I3C master device clocks the clock line (SCL) and the I3C slave device drives its I3C address onto the data line (SDA). In either case, a data payload (Mandatory Data Byte (MDB)) can be provided with the I3C address.

As noted above, the I3C interface is expected to provide for communication with a much larger number of I3C connected devices, such as where each processor of a typical server system may necessitate up to forty-eight or more I3C slave interfaces and where the typical server system may accommodate two, four, or eight processor cores. As such, it will be understood that the typical server system may accommodate several hundreds of unique I3C slave devices, each with a different dynamically remappable I3C address. Thus, even where several layers of I3C multiplexors such as I3C multiplexor 120 are utilized, and where each I3C multiplexor switches multiple I3C buses, the number of I3C slave interfaces on any particular I3C bus may reach into the hundreds. With all of these I3C slave interfaces generating IBIs, the probability that two or more IBIs arrive simultaneously is large. As such, the I3C specification provides that, in the case of conflicting IBIs, the I3C slave interface with the lowest I3C address wins the arbitration at the I3C master interface. A problem may arise when the number of I3C slave interfaces on a particular information handling system is so large that some I3C slave devices with higher I3C addresses may never have their IBIs serviced due to the priority placed on servicing the I3C slave devices with the lower I3C addresses because of the arbitration scheme. Here, the prioritization of the IBIs from the I3C slave interfaces with lower I3C addresses leads to starvation of the resources needed to service the IBI from the I3C slave interfaces with higher I3C addresses.

In a particular embodiment, information handling system 100 operates to dynamically sort allocated I3C addresses on I3C slave interfaces based upon the IBI frequency of each I3C slave interface, and upon the associated functions monitored and controlled by the I3C slave interface. In this way, the granularity of servicing of IBIs can be adjusted at selectable levels, such as at the memory channel level, the memory slot level, at the functional level (SPD hub, RCD, PMIC, temperature sensor, etc.), or the like. Here, in an evaluation process, an agent of information handling system 100, such as BMC 110, operates to track the IBIs that are received at I3C master interface, and to determine the frequency of each type of IBI received during a sampling interval. Then, by analyzing the IBI frequency information and the types of IBIs, BMC 110 can determine the likelihood that some I3C slave interfaces are having their IBIs starved due to being assigned a high I3C address. For example, BMC 110 can determine that a PMIC on a particular DIMM is associated with a I3C slave interface with a low I3C address is generating a large number of interrupts to report power delivery issues.

Then, BMC 110 can further determine that the I3C slave interfaces with higher I3C addresses and that are associated with the PMICs on other DIMMS on a common memory channel are not generating similar IBIs. Here, BMC 110 can make an inference that the I3C slave interfaces with the higher I3C addresses are in fact issuing similar IBIs, but that these IBIs are being starved due to their higher I3C addresses. Here, BMC 110 operates to assign lower I3C addresses to the I3C slave interfaces associated with the PMICs on the other DIMMs in order that their IBIs have a greater chance of being serviced. In another example, BMC 130 can determine that other elements of information handling system 100 are experiencing high temperature events, but that the I3C slave interfaces associated with the temperature sensors on the DIMMs are not similarly reporting temperature events. Here, BMC 110 can infer that the I3C slave interfaces associated with the temperature sensors on the DIMMs are in fact issuing IBIs related to temperature events, but that these IBIs are being starved due to their higher I3C addresses.

BMC 110 can determine that, for example, a large number of IBIs are being received from the I3C slave interfaces associated with the RCDs of the DIMMs that are related to the occurrence of correctable memory errors on the DIMMs, and are starving the I3C slave interfaces associated with the temperature sensors. In this case, BMC 130 may determine that the occurrence of temperature events are of greater priority than the reporting of correctable memory errors, and can assign the I3C slave interfaces associated with the temperature sensors lower I3C addresses than the I3C slave interfaces associated with the RCDs, or assign the I3C slave interfaces associated with the RCDs higher I3C addresses than the I3C slave interfaces associated with the temperature sensors.

In a particular embodiment, BMC 110 operates to reassign I3C addresses via one or more Common Command Codes (CCCs), that target Device Address Assignment (DAA), such as a RSTDA (reset device address) code for the target I3C slave interface, a SETNEWDA (set new device address) for the target I3C slave interface, or the like, without going through a DAA process for each I3C slave interface. In a particular embodiment, the I3C address space can initially be allocated in a way that a number of lower I3C addresses are unused, so that when a lower I3C address is needed, an unused I3C address can be assigned to a particular I3C slave interface. Further, the I3C address space can initially be allocated in a way that between used I3C addresses, there remain unused I3C addresses. In this way, BMC 130 can, with a fine granularity, assign I3C addresses between other used I3C addresses to closely manage IBI priorities. In either case, BMC 110 can manage the priorities of IBIs by reassigning only a particular I3C slave interface. In another embodiment, where the I3C address space is closely assigned, that is, with few unused I3C address between the I3C slave interfaces, when BMC 110 needs to manage the priorities of IBIs, the BMC may need to reassign several I3C addresses to insert a higher priority IBI into the I3C address space. In a particular embodiment, BMC 110 operates to update a I3C address table that is accessed by other master applications, so as to ensure that the other master applications are operating to a common IBI prioritization. The other master applications may include a co-processor, a thermal daemon, a power monitoring daemon, and the like.

Figure 2:
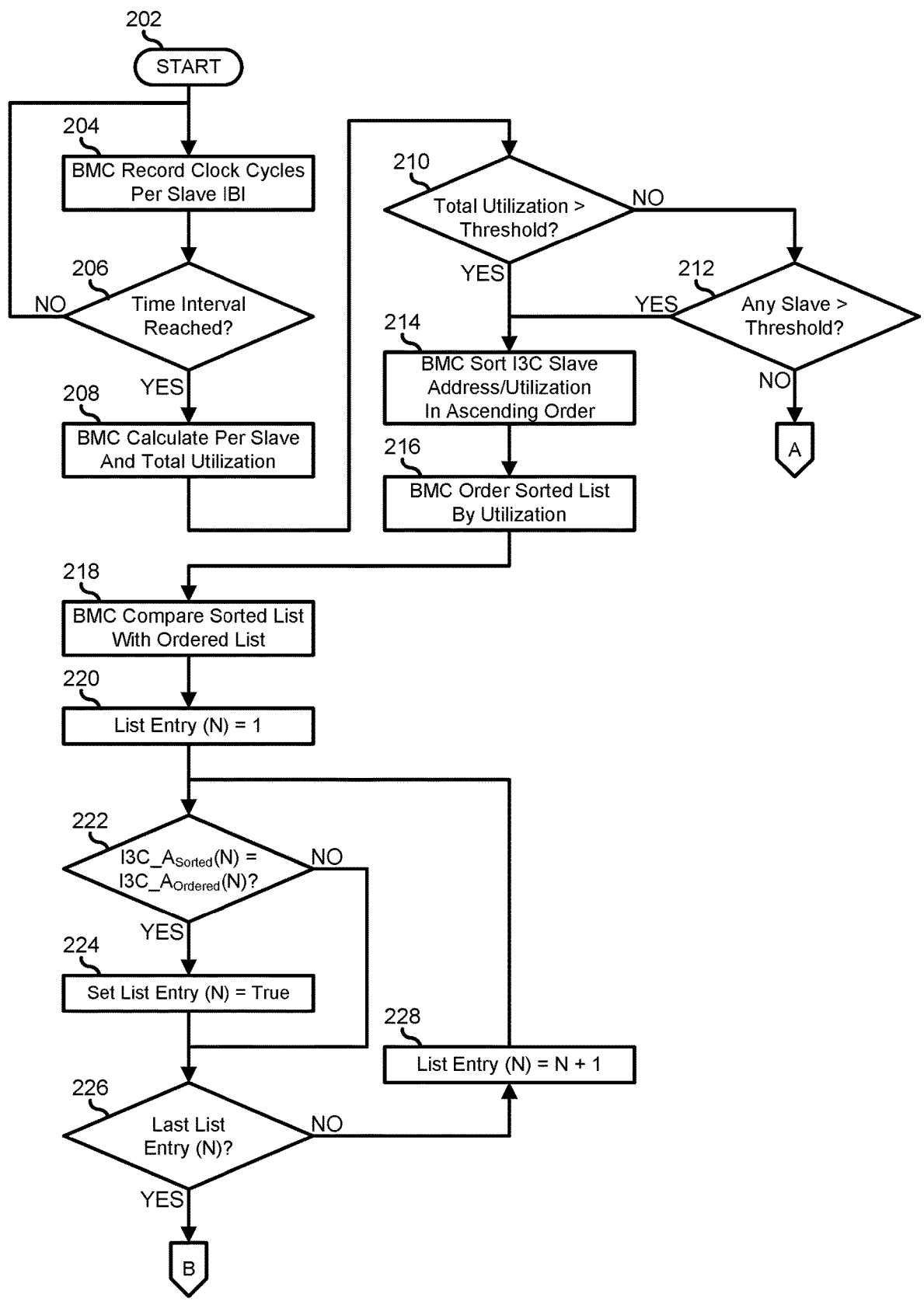
FIGS. 2 and 3 are a flowchart illustrating a method for overcoming IBI starvation with dynamic address remapping according to an embodiment of the present disclosure.
Figure 3:
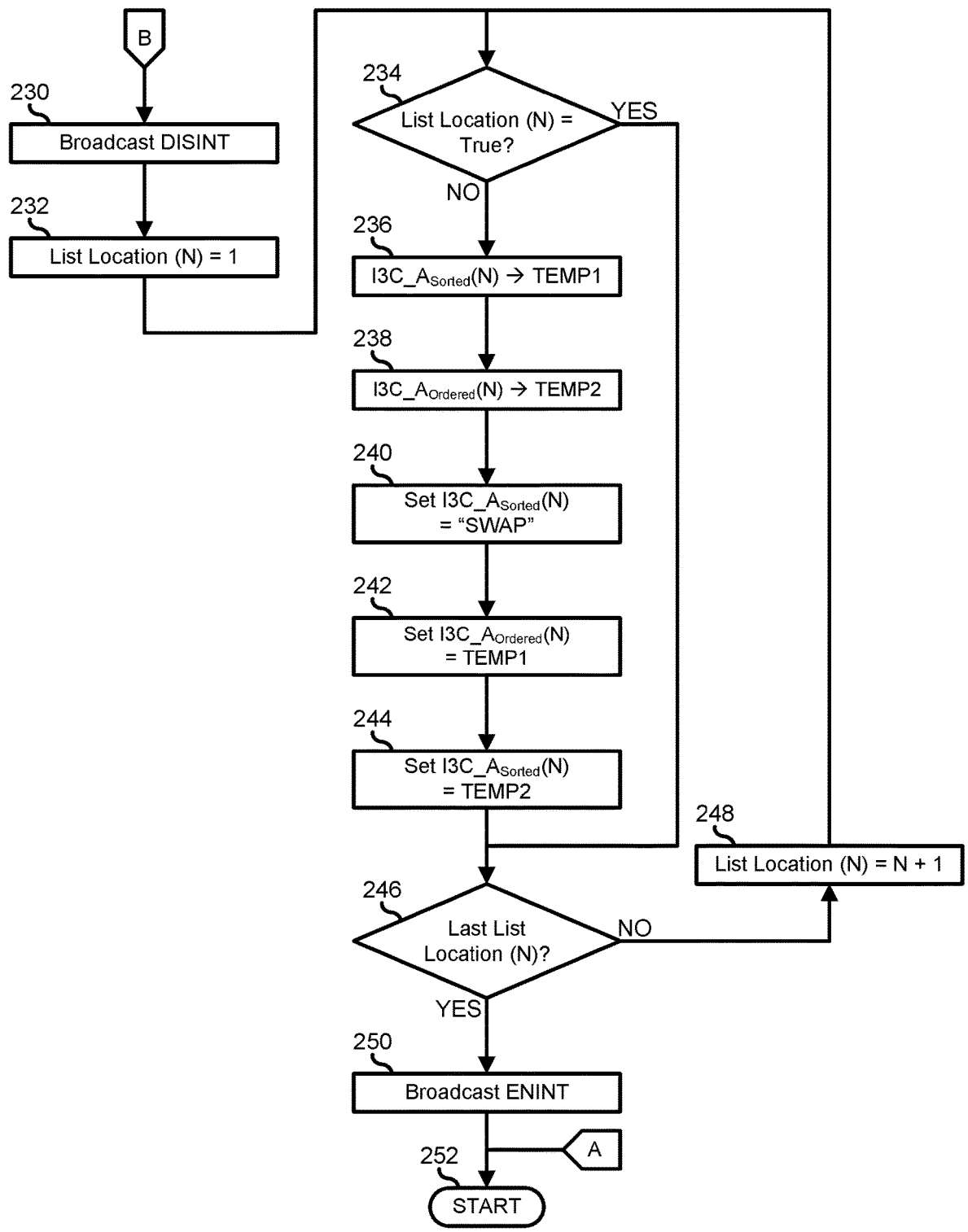

FIGS. 2 and 3 illustrate a method for overcoming IBI starvation with dynamic address remapping, starting at block 202. A BMC records a number of clock cycles utilized in receiving each I3C slave interface's IBIs in block 204, and a decision is made as to whether or not a time interval for recording the clock cycles has been reached in decision block 406. If so, the "NO" branch of decision block 206 is taken, and the method loops back to block 204 where the BMC records the number of clock cycles utilized in receiving each I3C slave interface's IBIs, until the time interval has been reached. When the time interval has been reached, the "YES" branch of decision block 206 is taken and the BMC calculates a per-slave utilization of the I3C bus and as a percentage of a total utilization in block 208. A decision is made as to whether or not the total I3C bus utilization is greater than a first threshold in decision block 210. An example of a first threshold may be a 90% threshold, a 95% threshold, or another threshold, as needed or desired. If the total I3C bus utilization is not above the first threshold, the "NO" branch of decision block 210 is taken and a decision is made as to whether or not the I3C bus utilization of any particular I3C slave interface is greater than a second threshold in decision block 212. An example of a second threshold may be a 75% threshold, a 80% threshold, or another threshold, as needed or desired. If the I3C bus utilization of any particular I3C slave interface is not above the second threshold, the "NO" branch of decision block 212 is taken and the method ends in block 252.

If the total I3C bus utilization is above the first threshold, the "YES" branch of decision block 210 is taken and the BMC sorts the I3C addresses of the I3C slave interfaces and their respective I3C bus utilization, as determined in block 204, in a table in ascending order in block 214. Also, if the I3C bus utilization of any particular I3C slave interface is greater than the second threshold, the "YES" branch of decision block 212 is taken and the method proceeds to block 214. An example of a sorted list is provided in Table 1, below. The sorted list is reordered by I3C bus utilization in block 216. An example of an ordered list is provided in Table 2, below.

TABLE 1

Sorted List

| SLAVE | ADDRESS | UTILIZATION (%) |
|---|---|---|
| A | 0X01 | 20 |
| B | 0X02 | 10 |
| C | 0X03 | 10 |
| D | 0X04 | 8 |
| E | 0X05 | 2 |
| F | 0X06 | 25 |
| G | 0X07 | 20 |
| H | 0X08 | 5 |

TABLE 2

Ordered List

| SLAVE | ADDRESS | UTILIZATION (%) |
|---|---|---|
| E | 0X05 | 2 |
| H | 0X08 | 5 |
| D | 0X04 | 8 |
| C | 0X03 | 10 |
| B | 0X02 | 10 |
| A | 0X01 | 20 |
| G | 0X07 | 20 |
| F | 0X06 | 25 |

The BMC compares the entries of the sorted list with the corresponding entries of the ordered list in block 218, where the steps for comparing the lists are detailed in blocks 222 thru 228. In block 220, a list entry number (N) is initialized to equal "1." A decision is made as to whether or not the I3C address for the I3C slave interface in the current list entry number (N) of the sorted list (I3C_$A_{sorted}$) is equal to the I3C address for the I3C slave interface in the current list entry number (N) of the ordered list (I3C_$A_{ordered}$) in decision block 222. If so, the "YES" branch of decision block 222 is taken, the list entry (N) is set as "TRUE" in block 224, and the method proceeds to decision block 226, as described hereinafter. If I3C_$A_{Sorted}$ is not equal to I3C_$A_{Ordered}$, the "NO" branch of decision block 222 is taken and the method proceeds to decision block 226. In decision block 226, a decision is made as to whether or not the current list entry number (N) points to a last list entry. If not, the "NO" branch of decision block 226 is taken, the list entry number (N) is incremented to N=N+1 in block 228, and the method returns to decision block 222 where a decision is made as to whether or not I3C_$A_{Sorted}$ is equal to I3C_$A_{Ordered}$. When the last list entry is evaluated, and the current list entry number (N) points to the last list entry, the "YES" branch of decision block 226 is taken and the I3C addresses of the I3C slave interfaces are reordered as shown in blocks 230-250.

In block 230, a command to disable all IBIs on from the I3C slave interfaces (DISINT) is broadcast by an I3C master interface of the BMC. The list entry number (N) is reinitialized to equal "1" in block 232, and a decision is made as to whether or not the entry indicated by the list entry number (N) is set to "TRUE" in decision block 234. If so, the "YES" branch of decision block 234 is taken and the method proceeds to decision block 246 as described below. If the entry indicated by the list entry number (N) is not set to "TRUE," the "NO" branch of decision block 234 is taken, indicating a potential for IBI starvation between the I3C slave associated with the I3C slave interface in at list entry number (N) in the sorted list, as compared with the I3C slave interface in the list entry number (N) in the ordered list, and the addresses are modified as described in blocks 236-244, described hereinafter.

In block 236, $I3C\_A_{sorted}(N)$ is written to a first temporary location (TEMP1), and $A_{ordered}(N)$ is written to a second temporary location (TEMP2) in block 238. A command is issued to the I3C slave interface at $I3C\_A_{sorted}(N)$ to set $I3C\_A_{sorted}(N)$ to a swap value (SWAP) in block 240. A command is issued to the I3C slave interface at $I3C\_A_{ordered}(N)$ to set $I3C\_A_{ordered}(N)$ to equal the value at the first temporary location (TEMP1) in block 242, and a command is issued to the I3C slave interface at $I3C\_A_{sorted}(N)$ to set $I3C\_A_{sorted}(N)$ to equal the value at the second temporary location (TEMP2) in block 244. After the addresses are modified in blocks 236-244, or after the "YES" branch of decision 234 is taken, as described above, a decision is made as to whether or not the current list entry number (N) points to a last list entry in decision block 246. If not, the "NO" branch of decision block 246 is taken, the list entry number (N) is incremented to N=N+1 in block 248, and the method returns to decision block 234 where a decision is made as to whether or not the entry indicated by the list entry number (N) is set to "TRUE." When the last list entry is evaluated, and the current list entry number (N) points to the last list entry, the "YES" branch of decision block 246, a command to enable all IBIs on from the I3C slave interfaces (DISINT) is broadcast by the I3C master interface of the BMC in block 250, and the method ends in block 252.

Figure 4:
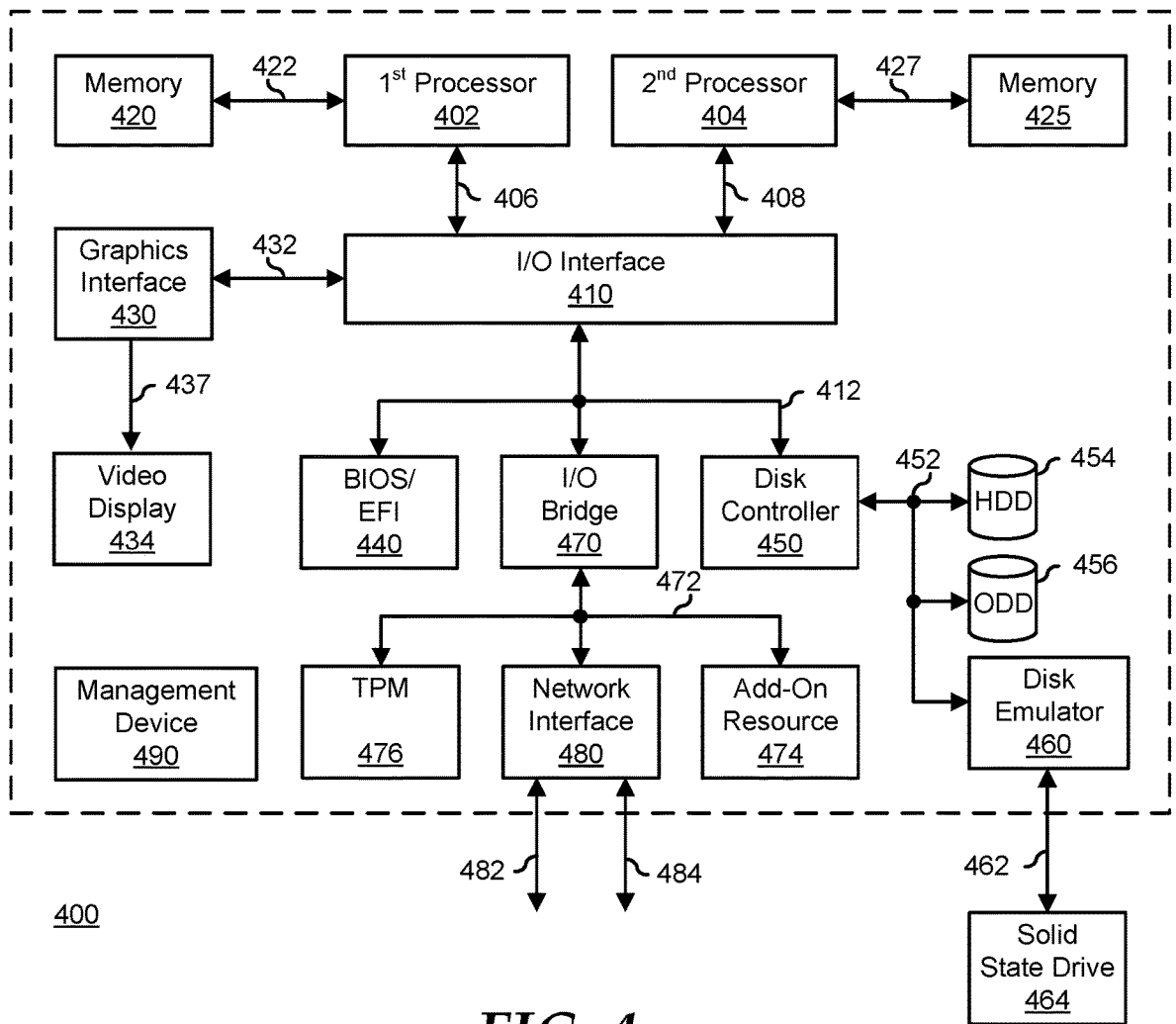
FIG. 4 is a block diagram illustrating a generalized information handling system according to another embodiment of the present disclosure.

FIG. 4 illustrates a generalized embodiment of an information handling system 400 similar to information handling system 100. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated BMC SoC device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an I2C or I3C interface, a PCIe interface, or the like, to provide an out-of-band mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 include a commercially available BMC product or other device that operates in accordance with an IPMI specification, a WSMan interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
    a processor including an Improved Inter-Integrated Circuit (I3C) master interface;
    a first device including a first I3C slave interface coupled to the I3C master interface, the first I3C slave interface configured to provide first In-Band Interrupts (Mb) to the I3C master interface and having a first I3C address; and
    a second device including a second I3C slave interface coupled to the I3C master interface, the second I3C slave interface configured to provide second Mb to the I3C master interface and having a second I3C address, wherein the second I3C address is higher than the first I3C address;
    wherein the processor is configured a) to receive the first Mb, b) to determine that the second IBIs are masked by the first IBIs due to the second I3C address being higher than the first I3C address, and c), in response to determining that the second Mb are masked by the first IBIs, to assign a third I3C address to one of the first I3C slave interface and the second I3C slave interface and assign a fourth I3C address to the other one of the first I3C slave interface and the second I3C slave interface.

2. The information handling system of claim 1, wherein, in assigning the third I3C address to one of the first I3C slave interface and the second I3C slave interface, the processor is further configured to assign the third I3C address to the second I3C slave interface, and wherein the third I3C address is lower than the first I3C address.

3. The information handling system of claim 1, wherein, in assigning the third I3C address to one of the first I3C slave interface and the second I3C slave interface, the processor is further configured to assign the third I3C address to the first I3C slave interface, and wherein the third I3C address is higher than the first I3C address.

4. The information handling system of claim 1, wherein the first and third I3C addresses are the same, and wherein the second and fourth I3C addresses are the same.

5. The information handling system of claim 1, wherein, in determining that the second IBIs are masked by the first IBIs, the processor is further configured to determine a frequency of the second IBIs.

6. The information handling system of claim 5, wherein, in determining that the second IBIs are masked by the first IBIs, the processor is further configured to determine that the frequency of the second IBIs is less than a threshold.

7. The information handling system of claim 6, wherein determining that the second IBIs are masked by the first IBIs is based upon the determination that the frequency of the second IBIs is less than the threshold.

8. The information handling system of claim 1, wherein the processor comprises a baseboard management controller.

9. A method, comprising:
coupling an Improved Inter-Integrated Circuit (I3C) master interface of a processor to a first I3C slave interface of first device separate from the processor, wherein the first I3C slave interface has a first I3C address;
providing, by the first I3C slave interface, first In-Band Interrupts (IBIs) to the I3C master interface;
receiving, by the processor, the first IBIs;
coupling the I3C master interface to a second I3C slave interface of second device separate from the processor, wherein the second I3C slave interface has a second I3C address;
providing, by the second I3C slave interface, second IBIs to the I3C master interface;
determining, by the processor, that the second IBIs are masked by the first IBIs due to the second I3C address being higher than the first I3C address;
assigning, by the processor, a third I3C address to one of the first I3C slave interface and the second I3C slave interface in response to determining that the second IBIs are masked by the first IBIs; and
assigning a fourth I3C address to the other one of the first I3C slave interface and the second I3C slave interface in further response to determining that the second IBIs are masked by the first IBIs.

10. The method of claim 9, wherein, in assigning the third I3C address to one of the first I3C slave interface and the second I3C slave interface, the method further comprises:
assigning, by processor, the third I3C address to the second I3C slave interface, wherein the third I3C address is lower than the first I3C address.

11. The method of claim 9, wherein, in assigning the third I3C address to one of the first I3C slave interface and the second I3C slave interface, the method further comprises:
assigning, by the processor, the third I3C address to the first I3C slave interface, wherein the third I3C address is higher than the first I3C address.

12. The method of claim 9, wherein the first and third I3C addresses are the same, and wherein the second and fourth I3C addresses are the same.

13. The method of claim 9, wherein, in determining that the second IBIs are masked by the first IBIs, the method further comprises:
determining, by the processor, a frequency of the second IBIs.

14. The method of claim 13, wherein, in determining that the second IBIs are masked by the first IBIs, the method further comprises:
determining, by the processor, that the frequency of the second IBIs is less than a threshold.

15. The method of claim 14, wherein determining that the second IBIs are masked by the first IBIs is based upon the determination that the frequency of the second IBIs is less than the threshold.

16. The method of claim 9, wherein the processor comprises a baseboard management controller.

17. An information handling system, comprising:
a processor including an I3C master interface;
a first device including a first I3C slave interface coupled to the I3C master interface, the first I3C slave interface configured to provide first IBIs to the I3C master interface and having a first I3C address; and
a second device including a second I3C slave interface coupled to the I3C master interface, the second I3C slave interface configured to provide second IBIs to the I3C master interface and having a second I3C address, wherein the second I3C address is higher than the first I3C address;
wherein the processor is configured a) to determine a frequency of the second IBIs, b) to determine, based upon the frequency of the second IBIs, whether the second IBIs are masked by the first IBIs due to the second I3C address being higher than the first I3C address, and c), in response to determining that the second IBIs are masked by the first IBIs, to assign a third I3C address to the second I3C slave interface and to assign a fourth I3C address to the first I3C slave interface, wherein the third I3C address is lower than the first I3C address.

18. The information handling system of claim 17, wherein the processor is further configured to determine that the frequency of the second IBIs is less than a threshold.

19. The information handling system of claim 18, wherein determining that the second IBIs are masked by the first IBIs is based upon the determination that the frequency of the second IBIs is less than the threshold.

20. The information handling system of claim 17, wherein the processor comprises a baseboard management controller.

* * * * *

UNITED STATES PATENT AND TRADEMARK OFFICE
CERTIFICATE OF CORRECTION

Page 1 of 1

PATENT NO. : 11,144,486 B2
APPLICATION NO. : 16/803075
DATED : October 12, 2021
INVENTOR(S) : Nihit S. Bhavsar et al.

It is certified that error appears in the above-identified patent and that said Letters Patent is hereby corrected as shown below:

On the Title Page

Abstract: Please change "the second IBIs are masked by the first Mb" to --the second IBIs are masked by the first IBIs--

In the Claims

Column 10, Line 44 In Claim 1: Please change "(Mb)" to --(IBIs)--

Column 10, Line 49 In Claim 1: Please change "Mb" to --IBIs--

Column 10, Line 54 In Claim 1: Please change "Mb" to --IBIs--

Column 10, Line 57 In Claim 1: Please change "Mb" to --IBIs--

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*